United States Patent [19]

Kupka

[11] Patent Number: 4,722,789
[45] Date of Patent: Feb. 2, 1988

[54] CHAMBER FILTER PRESS WITH ROTOR PLATES

[75] Inventor: Dieter Kupka, Neu-Ulm, Fed. Rep. of Germany

[73] Assignee: Baukooperation GmbH, Salzburg, Austria

[21] Appl. No.: 48,966

[22] Filed: May 13, 1987

Related U.S. Application Data

[63] Continuation of Ser. No. 757,006, Jul. 19, 1985, abandoned.

[51] Int. Cl.⁴ ..................... B01D 25/12; B01D 25/38
[52] U.S. Cl. .................................. 210/225; 210/231; 15/256.5; 100/198
[58] Field of Search ............ 15/256.5, 250.22, 256.52; 100/196, 198; 210/225, 227, 228, 229, 230, 231, 405, 407, 408, 413, 224

[56] References Cited

U.S. PATENT DOCUMENTS

| | | | |
|---|---|---|---|
| 628,057 | 7/1899 | Williamson | 210/225 |
| 713,717 | 11/1902 | Thompson | 210/225 |
| 1,042,803 | 10/1912 | Krassa | 210/225 |
| 1,259,032 | 3/1918 | Merrill | 210/225 |
| 1,833,335 | 11/1931 | Prutzman | 210/225 |
| 1,889,225 | 11/1932 | Sperry | 210/225 |
| 3,390,772 | 7/1968 | Juhasz | 210/225 X |
| 4,552,660 | 11/1985 | Schotten | 210/225 |

FOREIGN PATENT DOCUMENTS

| | | |
|---|---|---|
| 252577 | 10/1911 | Fed. Rep. of Germany . |
| 217590 | 3/1920 | Fed. Rep. of Germany . |
| 2226957 | 12/1973 | Fed. Rep. of Germany . |
| 2449817 | 9/1976 | Fed. Rep. of Germany . |
| 517876 | 5/1921 | France . |
| 1323483 | 2/1963 | France . |
| 1356496 | 2/1964 | France . |
| 230613 | 12/1984 | Japan .................... 210/225 |
| 100382 | 9/1969 | Netherlands . |
| 22560 | of 1912 | United Kingdom . |

Primary Examiner—Richard V. Fisher
Assistant Examiner—W. Gary Jones
Attorney, Agent, or Firm—Brooks Haidt Haffner & Delahunty

[57] ABSTRACT

The chamber filter press has chambers, which in each case include a hollow space for receiving pulp as well as a hollow space for receiving filtrate on the one or the other side of a filter medium and can be opened after the filtering operation for removal of the filter cake from the respective filter medium as well as from the respective hollow space for receiving pulp. The hollow spaces for receiving pulp are in each case provided with a rotatable as well as an axially displaceable rotor for agitating the pulp, as well as for kneading the filter cake with stirring and compression during the filtering operation and for compressing as well as removing the filter cake after the filtering operation. The chambers can be opened for the simultaneous removal of the filter cake by means of the rotors from the hollow spaces for receiving pulp of all chambers, or first from those of one end and then from those of a second group of chambers simultaneously or simultaneously in each group.

11 Claims, 16 Drawing Figures

CHAMBER FILTER PRESS WITH ROTOR PLATES

This application is a continuation of application Ser. No. 757,006, filed July 19, 1985, now abandoned.

BACKGROUND OF THE INVENTION

The invention relates to a chamber filter press.

Conventional chamber filter presses consist of a horizontal stack of chamber plates secured to each other, which, in each case, have a recess on both sides and are provided with a filter medium, as for example, a filter cloth. Two filter media, provided between each pair of two adjacent chamber plates, divide the inner space, formed by two adjacent recesses, into a central hollow space for receiving pulp and, on the chamber-plate side, two hollow spaces for receiving filtrate, which are connected with a pulp feed pipeline and a filtrate discharge pipeline respectively. After the filtering operation, the chamber plates are moved apart consecutively in order to remove, in each case, the two filter cakes to be found on the two filter media lying opposite to each other. Before the chambers of these chamber filter presses are opened, the filter cakes can be washed with a suitable liquid, usually water, which is supplied over the pulp feed pipeline. Subsequently, for dewatering, the filter cakes can be treated with compressed air, which also can be supplied over the pulp feed pipeline. In addition, it is possible to act upon the hollow spaces that receive filtrate with a vacuum, for which purpose the filtrate discharge piepline can be connected with a vacuum pipeline or a vacuum source. In order to achieve the lowest possible residual moisture content in this filter cake, it is furthermore known that a flexible membrane may be provided, which is pressed against the filter cakes on the side facing away from the respective filter medium by means of a pressurized liquid medium, usually water under pressure.

All known chamber filter presses have only a limited capacity. The filter cakes must therefore be removed at relatively short intervals and consequently, it takes much effort to operate these presses, particularly since it is relatively difficult to remove the filter cakes with the required degree of thoroughness. The known chamber filter presses furthermore are heavy, especially because of the heavy, material-intensive, supporting structure for the chamber plates, which requires additional space. A continuous, automated method of operating over longer periods of time with little effort on the part of the operator is not possible. Moreover, desired filter cake quality can also not always be achieved. For example, it happens frequently that, when the filter cake is treated with compressed air, it develops cracks, through which the compressed air passes and is ineffective.

The so-called plate and frame filter presses represent a modification of the chamber filter presses. These differ from the actual chamber filter presses only due to the fact that a frame, which encloses the hollow space for receiving the pulp, is inserted between two adjacent chamber plates. The problems mentioned above are also associated with the plate and frame filter presses.

Chamber filter presses are also known, in which the chamber plates are arranged in a vertical stack and two adjacent chamber plates in each case form a chamber consisting of a hollow space for receiving pulp as well as a hollow space for receiving filtrate on the one or the other side of a filter medium. In order to remove the filter cake, the chamber plates are lowered so that the chambers, which are on top of one another, are opened consecutively from the top to the bottom. The filter medium is formed from an endless filter cloth belt, which is passed in zigzag fasion between the chamber plates and, after the chambers are opened, is driven to dispense the filter cakes on two opposite sides of the pulled-apart stack of chamber plates, whereby the filter cloth belt subsequently can be run past spray jets, in order to be washed with a suitable liquid, usually water. These chamber filter presses have the same disadvantages as those described above. However, the most disturbing feature is that the filter cloth belt tears frequently, resulting in frequent down times and expensive repairs.

The art also includes so-called process filter equipment. Besides the actual filtering process, such equipment enables other processing steps to be carried out, such as stirring, heating and/or cooling, evaporating and drying to be carried out in order to treat the medium added. These processing steps can be conducted in a closed space, so that harmful products cannot reach the surrounding atmosphere, although the possibility of this is not excluded while the filter cakes are being removed. This equipment, however, has an extremely low filter capacity, since it is provided with only a single filter medium which covers the cross section of the interior space. Moreover, it is necessary to resort to expensive measures in order to remove the filter cake.

It is an object of the invention to provide a chamber filter press wherein each chamber has a hollow space for receiving pulp and a hollow space for receiving filtrate on one or the other side of a filter medium respectively, and which can be opened after the filtering process for removing the filter medium and from the respective hollow space and for receiving the pulp. The press, while having a simple and light construction and requiring the least possible operating effort, especially as a result of automatically and thoroughly discharging the filter cake from the chambers, has a higher capacity and is able to filter over longer periods of time. Yet it permits the achievement of an exceptionally high filtrate and filter cake quality, including an exceptionally low filter cake moisture content. The press can be so constructed that no substance can escape into the surrounding atmosphere, not even while the filter cakes are being removed from the chambers.

SUMMARY OF THE INVENTION

The invention provides a chamber filter press having chambers, in which each chamber includes a hollow space for receiving pulp as well as a hollow space for receiving filtrate on the one or the other side of a filter medium and which can be opened after the filtering operation for removal of the filter cake from the respective filter medium as well as from the respective hollow space for receiving pulp. The hollow spaces for receiving pulp are in each case provided with a rotatable as well as an axially displaceable rotor for agitating the pulp, as well as for kneading the filter cake with stirring and compression during the filtering operation after the filtering operation. The chambers can be opened for the simultaneous removal of the filter cake by means of the rotors from the hollow spaces for receiving pulp of all chambers, or first from those of one end and then from those of a second group of chambers simultaneously or simultaneously in each group.

DETAILED DESCRIPTION OF THE PREFERRED EMBODIMENTS

Figure 1:
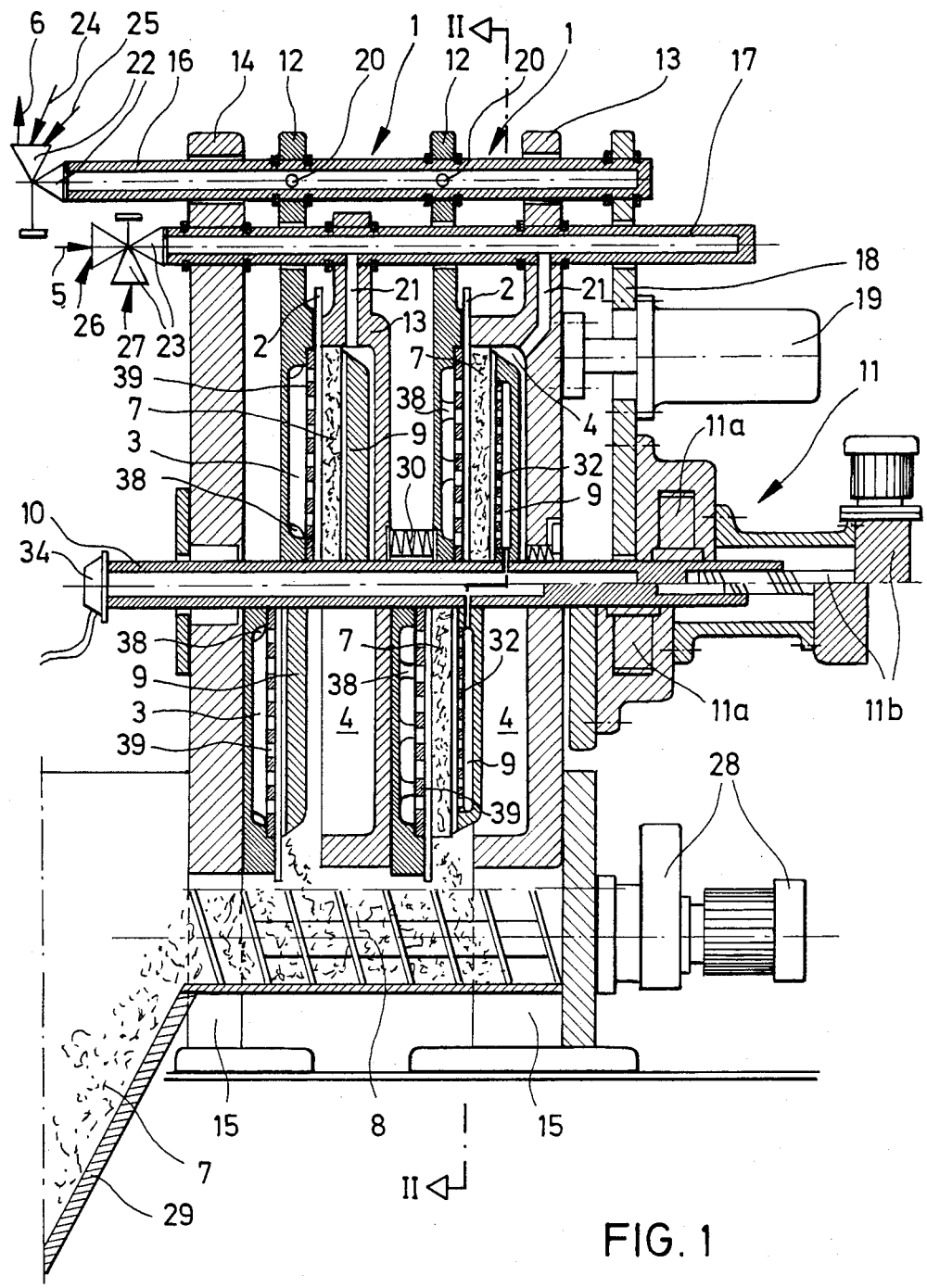
FIG. 1 shows the middle longitudinal section of a first specific embodiment, two different rotor designs being shown.

The chamber filter presses shown have several chambers shown generally by 1, each having a filter medium 2 as well as a hollow space 3 for receiving filtrate and a hollow space 4 for receiving pulp on the one or the other side of the filter medium 2. The pulp to be filtered is supplied over a pulp feed pipeline 5, and the filtrate is drawn off over a filtrate outlet pipeline 6. After the filtering operation, the chambers 1 can be opened up to remove the filter cakes which have accumulated on the filter medium during the filtering operation and which are constantly growing from the filter media 2 and the hollow spaces 4 that receive the pulp. The filter cakes 7 removed are transported away by means of a lower worm conveyor 8, a lower belt conveyor or by some other means.

The hollow spaces 4 for receiving pulp are each provided with a reversibly rotatable as well as axially displaceable rotor 9, whose function it is to agitate the pulp in the respective hollow space 4 during the filtering operation and to stir and compress the filter cakes 7 in hollow space 4, that is, to knead them appropriately, and, after the filtering operation, to compress the filter cakes 7 in order to dewater them, as well as to remove them from the adjoining filter medium 2 and to discharge them from the hollow space 4 of the corresponding opened chamber 1.

The agitation processes, brought about in this manner during the filtering operation in the chambers 1, result in filter cakes 7 and a filtrate of outstanding quality and permit the formation of exceptionally thick filter cakes 7. In other words, the agitation processes ensure a high capacity for the chamber filter presses, so that they can filter uninterruptedly over longer periods of time than conventional filter presses, for example for 24 hours instead of for 8 hours as with conventional filter presses, before it becomes necessary to discharge the filter cake 7. Moreover, such discharge is accomplished rapidly and thoroughly with the aid of rotors 9, without requiring manual work. An exceptionally low residual moisture content of the filter cakes 7 can also be achieved with the aid of the rotors 9.

The hollow spaces 4 for receiving the pulp are of relatively deep construction, as is required for holding the respective rotor 9 and the respective filter cake 7, which is relatively thick at the end of a filtration period. The hollow spaces 4 have a circular contour corresponding to the contour of the rotor 9, in order to enclose the rotor at its periphery. The hollow spaces 3 for receiving filtrate and the filter media 2 are also circular.

The rotors are attached to a common rotor shaft 10, which rotates and is axially displaceable on bearings and is connected to a rotational and axial displacement drive unit 11 and can be actuated by this drive unit for back and forth rotation as well as axial back and forth displacement of the rotors 9 in the hollow spaces 4 of chambers 1 for receiving pulp. The rotational and axial displacement drive unit, shown generally by 11, of a rotational drive unit, with a gearwheel 11a, which is seated nonrotatably on the rotor shaft 10, and of an axial displacement drive unit with a threaded wheel 11b, which, relative to the gearwheel 11a that is arranged axially displaceably on rotor shaft 10, is stationary in the axial direction and the thread of which meshes with a corresponding thread of the rotor shaft 10 or with hydraulic working cylinders 11c, by means of which the gearwheel 11a, which is axially stationary relative to rotor shaft 10, can be displaced back and forth.

For each chamber 1, the chamber filter press of FIG. 1 has a first chamber plate 12, in which the hollow space 3 of chamber 1 for receiving filtrate is formed and at which the filter medium 3 covering the hollow space 3 is provided, and a second chamber plate 13, in which the hollow space 4 of chamber 1 for receiving pulp is formed. Moreover, an end plate 14 is provided at the left end in FIG. 1. The rotor shaft 10 extends horizontally and penetrates the essentially circular, vertical chamber plates 12 as well as 13 and end plate 14 in about the center. The second chamber plate 13 and the end palte 14 are arranged in stationary fashion, the end plate 14 and the second chamber plate 13 at the right end of the chamber filter press in FIG. 1 being provided with lower base feet 15. If necessary, appropriate base feet 15 can also be provided at one or several of the other second chamber plates 13, just as it is possible to provide a separate end plate 14 with lower base feet 15 for support on the floor at the right end of the chamber filter press in FIG. 1. In contrast to this, first chamber plates 12 are arranged movably, in order to be able to open chambers 1 for removal and discharge of the filter cakes 7 by means of rotors 9, all of which occurs simultaneously for all chambers 1, as will be further described below.

The movable first chamber plates 12 are penetrated in the respective edge region by a first connecting rod 16, which extends above and parallel to the rotor shaft 10 and are attached to the first connecting rod 16. The stationary second chamber plates 13 and the end plate 14 are also penetrated by a second connecting rod 17, which runs below the first connecting rod 16 parallel to the rotor shaft 10, and at which the second chamber plates 13 as well as the end plate 14 are attached. The second connecting rod 17 furthermore penetrated vertically through the first chamber plates 12, which are guided on the second connecting rod 17 as well as on the rotor shaft 10. The first connecting rod 16 furthermore penetrates through the stationary end plate 14 and the stationary second chamber plate 13 vertically at the right end of the chamber filter press in FIG. 1 and is guided in these. Furthermore, the first connecting rod 16, which is supported so as to be axially displaceable, is attached to an external crossbar 18, which is constructed in the form of a plate and arranged parallel to the second chamber plate 13 at the right end of the chamber filter press in FIG. 1 and carries the rotational as well as axial drive unit 11 of the rotor shaft 10, as well as a further drive unit 19, the function of which is to move the cross bar 18 back and forth, the first connecting rod 16 and the first chamber plate 12 relative to the second chamber plates 13 and the stationary end plate 14 in the direction of the rotor shaft 10 and the two connecting rods 16 and 17, and which, as shown, is formed by a double acting hydraulic working cylinder.

The first connecting rod 16 as well as the second connecting rod 17 are hollow and connected over connecting boreholes 20 and 21, respectively with the hollow spaces 3 of the first chamber plates 12 for receiving filtrate or to the hollow spaces 4 of the second chamber plates 13 for receiving pulp, and still further over a valve 22 or 23, respectively, to the filtrate outlet pipeline 6, a feed pipeline 24 for a liquid, preferably water, for washing the filter medium 2 and/or the filter cake 7, and a vacuum pipeline 25 for dewatering the filter cakes 7 further, or to the pulp feed pipeline 5, a feed pipeline 26 for a liquid, preferably water, for washing the filter cake 7 and/or the filter medium 2 and a feed pipeline 27 for a gaseous pressure medium, preferably compressed air, for dewatering the filter cakes 7 further. After a filtering period, the chambers 1 are opened simultaneously for simultaneously removing and discharging the filter cakes 7 by means of rotors 9 from the hollow spaces 4 of all chambers 1 for receiving pulp. For this purpose, the first chamber plates 12 and the second chamber plates 13 are simultaneously moved apart, and moreover by means of the drive unit 19, which moves the first chamber plates 12 over the crossbar 18 and the first connecting rod 16 out of the closed position in accordance with the upper half of FIG. 1 into the open position in accordance with the lower half of FIG. 1, in which the first and second chamber plates 12 and 13 respectively, lie adjacent to each other or are removed from one another. Since the rotational as well as axial displacement drive unit 11 of rotor shaft 10 is attached to crossbar 18, the rotor shaft 10 is also displaced correspondingly in the axial direction so as to carry the filter cakes 7 along. It is sufficient to switch on the rotational as well as the axial displacement driven unit 11 in the open position, in order to discharge the filter cakes 7 thoroughly and to remove them from the filter media 2.

With the help of the screw conveyor 8, which is set in motion by a drive unit 28, the withdrawn solids reach a discharge chute or a discharge hopper 29.

During the filtering operation, valves 22 and 23 are operated so that the first connecting rod 16 is connected with the filtrate outlet pipeline 6 and the second connecting rod 17 is connected with the pulp feed pipeline 5 and the filtrate can drain away constantly from chambers 1 or their hollow spaces 3 for receiving filtrate and the pulp can run constantly into the chambers 1 or their hollow spaces 4 for receiving pulp. The rotational as well as axial displacement drive unit 11 of rotor shaft 10 is switched on in order to turn and axially displace the rotors 9 in the hollow spaces 4 of the closed chambers 1 for receiving pulp alternately in one and then in the other dirction, so that the pulp in the hollow spaces 4 is agitated and the filter cakes 7, forming on the filter media 2, experience an agitative as well as a compressive kneading. At the end of a particular filtering period and before chambers 1 are opened, valves 22 and 23 can be activated in order to connect the first connecting rod 16 with the liquid feed pipeline 24 for the purpose of washing the filter media 2 and/or the filter cake 7 or with the vacuum pipeline 25 for the purpose of dewatering the filter cakes 7 in addition to compressing them with the rotors 9 and to connect the second connecting rod 17 with the liquid feed pipeline 26 for the purpose of washing the filter cakes 7 and/or the filter medium 2 or with the pressure medium feed pipeline 27 additionally for dewatering the filter cakes 7 and compressing them with rotors 9. In the last-mentioned case, it is advisable to let the rotors circulate, in order to smooth out the filter cakes 7 and to avoid the formation of cracks, so that the particular gaseous pressure medium supplied, preferably compressed air, cannot flow ineffectively through any cracks or other openings that may exist in the filter cakes 7.

After the filter cakes 7 are removed or discharged from the chamber filter press, chambers 1 are closed once again simultaneously by means of drive unit 19, which moves the first chamber plates 12 simultaneously against the stationary second chamber plates 13, holding them pressed tightly against the latter in this closed position. The next filtration period can then take place.

Suitable seals are provided in order to seal those areas where the rotor shaft 10 penetrates through chamber plates 12 and 13. For example, sealing bellows 30 can be provided between the chambers 1, which enclose the rotor shaft 10 and extend between a first chamber plate 12 and the adjacent chamber plate 13. A kinematic reversal is also possible in such a manner that the second chamber plates 13 with the hollow spaces 4 for receiving pulp, as well as their connecting rod 17 is arranged movably and that this second connecting rod 17 is provided with a crossbar 18, while the first chamber plates 12 with the hollow spaces 3 for receiving filtrate, including the first connecting rod 16, are arranged in a stationary fashion and provided with the lower base feet 15, which in other respects make a relatively light and space-saving construction of the chamber filter press possible, since, because of the single support of the chambers 1 on the floor, the heavy, material-intensive and projecting common supporting structure for all chambers, which is a characteristic of conventional chamber filter presses, is omitted.

It is furthermore possible to provide several first connecting rods 16 or second connecting rods 17 respectively which are essentially distributed uniformly about the rotor shaft 10 instead of a single first connecting rod 16 for the first chamber plates 12 and instead of a single second connecting rod 17 for the second chamber plates 13. This is the case with the chamber filter press of FIG. 2, which essentially differs from that of FIG. 1 that three axially displaceable first connecting rods 16 and two stationary second connecting rods 17 are provided. The connecting rods 16 and 17 are distributed essentially uniformly about the rotor shaft 10.

Figure 2:
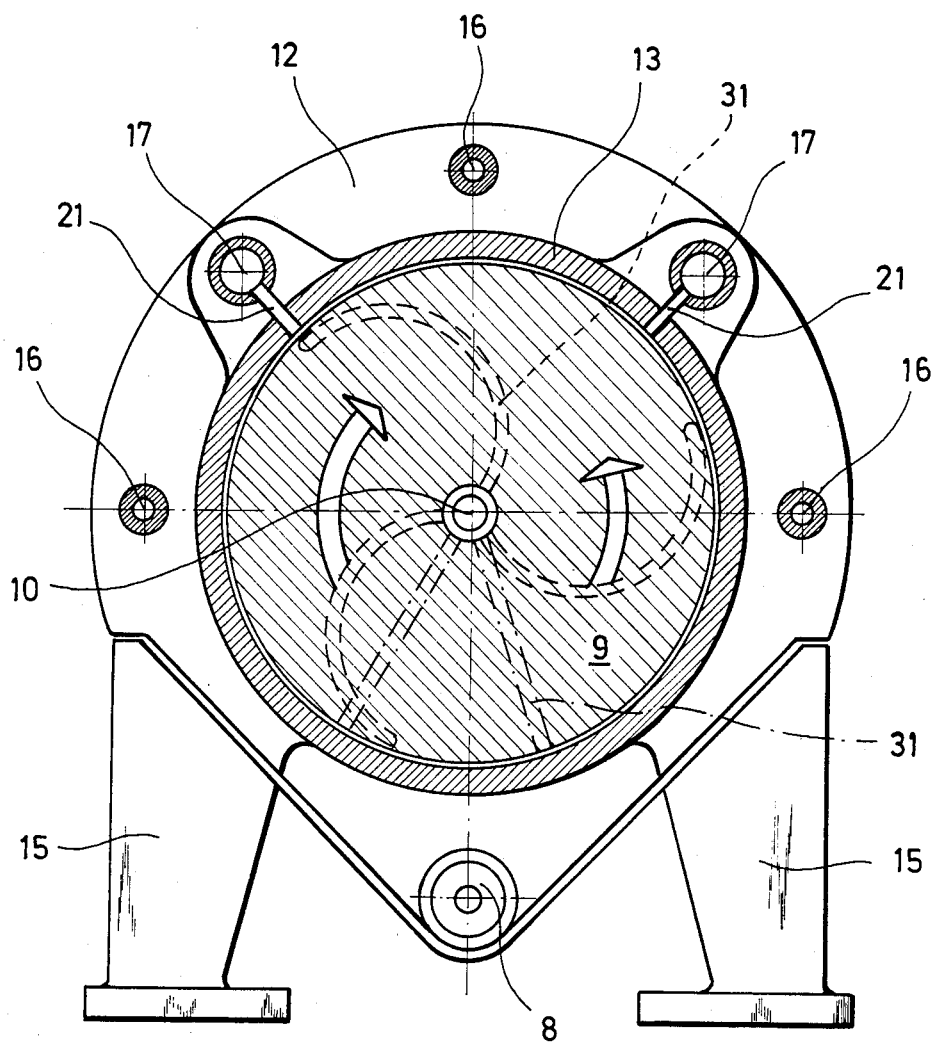
FIG. 2 shows a section along the line II—II in FIG. 1 of a variant, two sets of differently constructed radial rotor ribs being indicated.

In accordance with FIG. 2, the rotors 9 are in each case provided on the filter cake side with straight or curved radial ribs 31, as indicated the by dot-dash or broken lines. They are provided as required, just as their number is chosen as required. A radial rib 31 may suffice in some cases. The radial ribs 31 may, for example, have a rectangular, trapezoidal, parallelogram-shaped or rounded cross-section and induce centrifugal forces during the removal or discharge of the filter cake. Thus enhancing the discharging of the filter cake.

As shown in the right half of FIG. 1, the rotors 9 can also be hollow and be provided on the filter cake side with openings 32 for spraying, in order to be acted upon by a suitable liquid, preferably water, for washing the filter cakes 7 and/or the filter medium 2. This liquid is supplied over the hollow rotor shaft 10, which is provided with connecting boreholes 33 to the hollow rotors 9 as well as with a distribution head 34 for the wash liquid. It is also possible to employ a gaseous pressure medium, preferably compressed air, at the distribution head 34 and the hollow rotor shaft 10 as well as its connecting boreholes 33 on the hollow rotors 9 in order to dewater the filter cakes 7 in addition to the dewatering accomplished by compression with the rotors 9.

Figure 3:
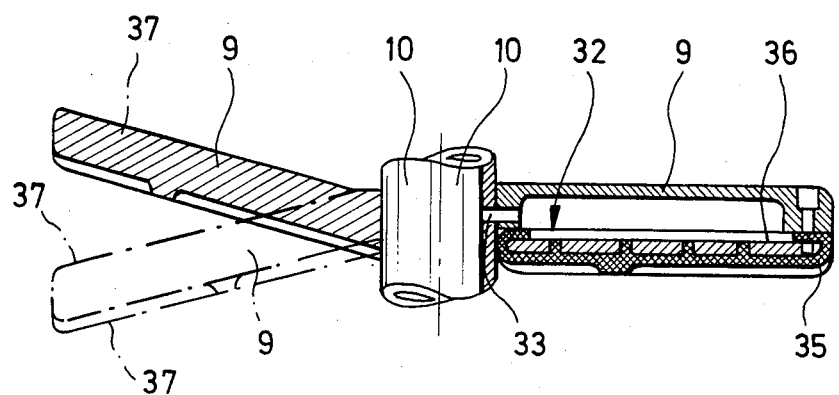
FIG. 3 shows a longitudinal section through a rotor, different rotor designs being illustrated in the left and right halves.

As shown in the right half of FIG. 3, the hollow rotors 9 can also be provided in each case on the filter cake side with a flexible membrane 35, which lies on a perforated backing plate 36 and can be pressed against the adjacent filter cake 7 in order to dewater it further. This pressure is exerted by a gaseous or liquid pressure medium, preferably water under pressure which is supplied over the distribution head 34 and the hollow rotor shaft 10 as well as its connecting boreholes 33 to the hollow rotors 9. It is evident from the left half of FIG. 3 that the rotors 9 may have a conical construction and conical front surfaces 37, in the same way as the chambers 1. According to the right and left halves of FIG. 1, the filter media 2 in each case lie on block- or rib-shaped projections 38 over a perforated backing plate 39, which is at a distance from the bottom of the hollow space 3 of the corresponding first chamber plate 12 for receiving filtrate. The rib-like projections extend radially to the rotor shaft 10 and are distributed uniformly about the same, in the same manner as the block-shaped projections 38 can be arranged in radial rows distributed uniformly about the rotor shaft 10. In those special cases where the filter cakes 7 consist of highly abrasive solids can the filter media 2 can be provided on the filter cake side with a perforated cover, e.g. a slotted or perforated metal foil or a metallic cloth as protection against abrasion.

Figure 4:
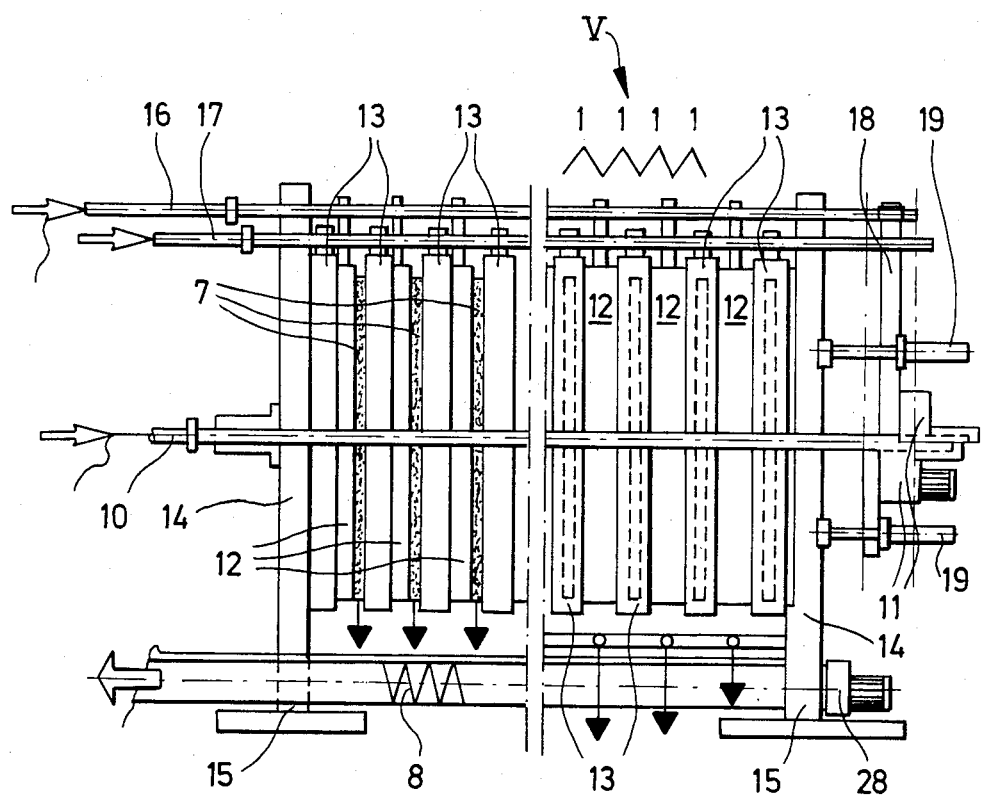
FIG. 4 shows a side view of a second specific embodiment.
Figure 5:
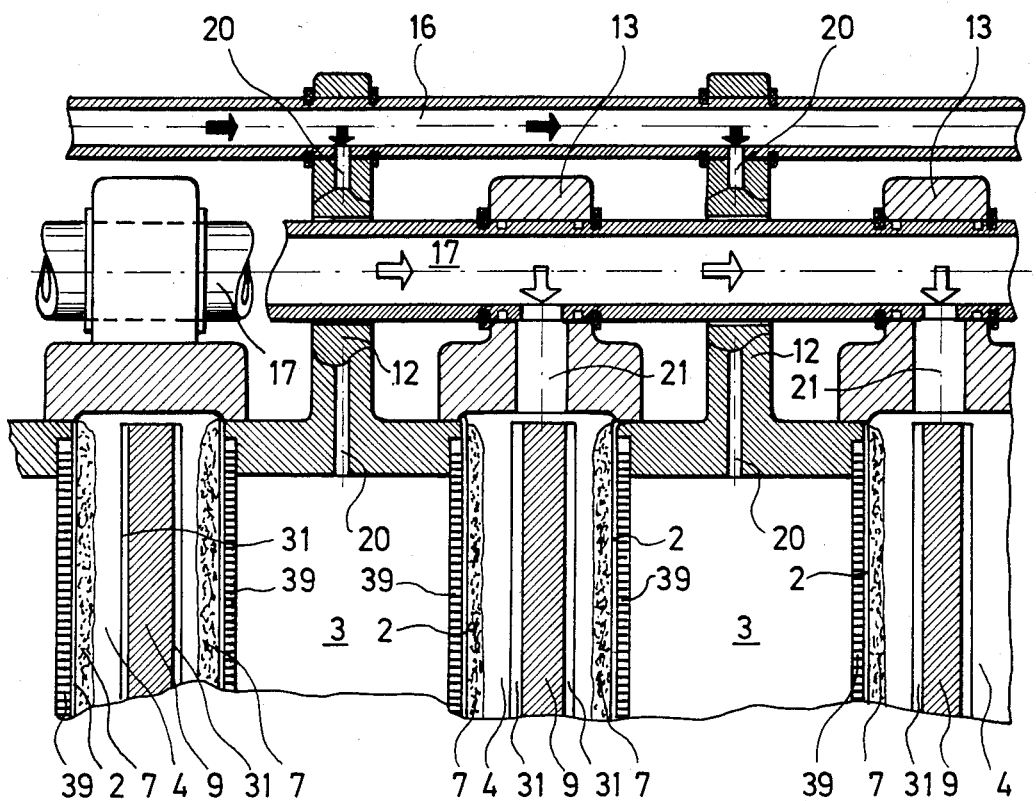
FIG. 5 shows the middle longitudinal section of a detail V in FIG. 4 on a larger scale.

The chamber filter press of FIGS. 4 and 5 differs essentially from that of FIG. 1 in that the chambers 1 have a different construction and are opened differently for removing or discharging the filter cakes 7. The chambers 1 are combined into pairs, each with a common first chamber plate 12, which encloses a hollow space 3 for receiving filtrate, which is assigned to both chambers 1 and which, on both sides and in each case, has a filter medium 2 that covers hollow space 3. In each case, 2 adjacent chamber plates 12 are surrounded by a second chamber 13, which encloses a hollow space 4 for receiving pulp, and is assigned to two chambers 1, namely the two adjacent chambers 1 of two contiguous chamber pairs, and in which a rotor 9 is arranged, which acts on both sides on the pulp and on the two filter cakes 7 in the hollow space 4. In the second chamber plate 13 at the two ends of the chamber filter press with two end plates 14 with lower base feet 15, the respective rotor 9 needs to act only on one side, as with rotors 9 if the chamber filter press of FIG. 1. These two second chamber plates 13 are in each case closed off on the corresponding side facing away from the first chamber plate 12.

The chamber filter press of FIGS. 4 and 5 functions in exactly the same manner as that of FIG. 1, with the exception of the opening and closing of chambers 1. The opening of chambers 1 takes place in two steps; first the chambers 1 of a first group and then the chambers 1 of a second group being opened simultaneously, in order to remove the filter cakes 7 simultaneously by means of the rotors 9 from the hollow spaces 4 for receiving pulp, and moreover first from those of the first and then from those of the second group of chambers 1, namely the group of chambers 1 on the one side of the rotor 9 and the group of chambers 2 on the other side of the rotor 9 respectively. For this purpose, the first chamber plates 12 are moved by means of the drive unit 19 over the crossbar 18 and the first connecting rod 16 simultaneously moved first in one direction and then in the reverse direction. For example, in FIGS. 4 and 5 they are moved, first to the left and then to the right, so that they are pulled out of the closed position as shown in the right half of FIG. 4, in which the first chamber plates 12, as shown in FIG. 5, are, in each case, overlapped on both sides by the two adjacent second chamber plates 13, into the first open position, as shown in the left half of FIG. 4, in which the first chamber plates 12 in each case on the right side are pulled out of the adjacent second chamber plate 13 and, on the other left side, are pushed into the adjacent second chamber plate 13, or run into a second open position, in which conversely the first chamber plates 12 on the other, left side are pulled out of the adjacent second chamber plate 13 and, on the one, right side, are pushed into the adjacent second chamber plate 13. After removal or discharge of the filter cakes, the first chamber plates are then brought once again into the middle closed position of FIG. 5. As with the chamber filter press of FIG. 1, there is also a kinematic reversal with that of the press of FIGS. 4 and 5 because the first chamber plates 12 with hollow spaces 3 for receiving filtrate are arranged in a stationary fashion and the second chamber plates 13 with the hollow spaces 4 for receiving pupl are movably arranged.

Figure 6:
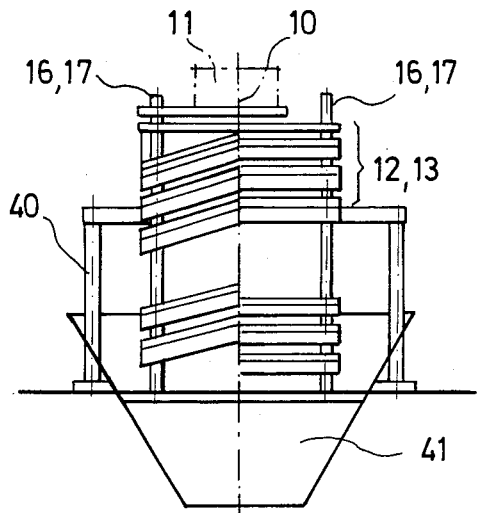
FIG. 6 shows a side view of variants of the specific embodiments of FIGS. 1 to 5, one variant being shown in the left half and a different variant in the right half.

In accordance with FIG. 6, the chamber filter presses of FIGS. 1 to 5 can also be arranged in such a manner, that the rotor shaft 10 runs vertically. The base feet 15 are replaced by a framework 40, and a lower discharge hopper 41 is provided, into which the filter cakes 7 can be discharged. While in the right half of FIG. 6 a chamber filter press with flat chamber plates 12 and 13, filter media 2 and rotors 9 is illustrated, in much the same way as in FIGS. 1, 4 and 5, the left half of FIG. 6 shows a chamber filter press with conical chamber plates 12 and 13, filter media 2 and rotors 9, as clearly shown by the left half of FIG. 3.

In the chamber filter presses of FIGS. 7 to 16, the chambers 1 are situated in a common chamber housing 50 and formed by a stack 51 of chamber plates 52 and spacers 53. The chamber plates 52 are provided with hollow spaces 3 for receiving filtrate as well as the filter media 2, which cover the hollow space 3 of the respective chamber plate 52. The spacers 53 are arranged in each case between two adjacent chamber plates 52 or at one end of the stack 51 between an end plate 54 and the adjacent chamber plate 52, in order to form the hollow spaces 4 for receiving pulp and are provided with laterial filter cake discharge openings 55. The chamber housing 50 and the stack 51 with the rotors, which are arranged in the hollow spaces 4 for receiving pulp can be moved apart so that the chambers 1 can be opened up simultaneously and the filter cakes 7 removed or discharged by means of the rotors 9 simultaneously from the hollow spaces 4 of all chambers 1, after which the chambers 1 can be closed simultaneously.

The chamber plates 52 are in each case penetrated vertically in about the center by the rotor shaft 10, which is hollow. Within the hollow rotor shaft 10, a tie rod 56 is arranged, which fastens the chambers plates 52, spacers 53 and end plate 54 of the stack 51 to each other, the rotational and axial displacement unit 11 of rotor shaft 10 being connected with the stack 51. The chamber housing 50 and the stack 51 with the rotational and axial displacement drive unit 11 of the rotor shaft 10 can be moved relative to each other in an axial direction by means of a drive unit 57, which is simular to the drive unit 19 of the previously described chamber filter presses, between a closed position and an open position for the filter cake discharge openings 55 of the spacers 53, in which positions the chamber housing 50 and the stack 51 are adjacent to or removed from each other respectively.

Figure 7:
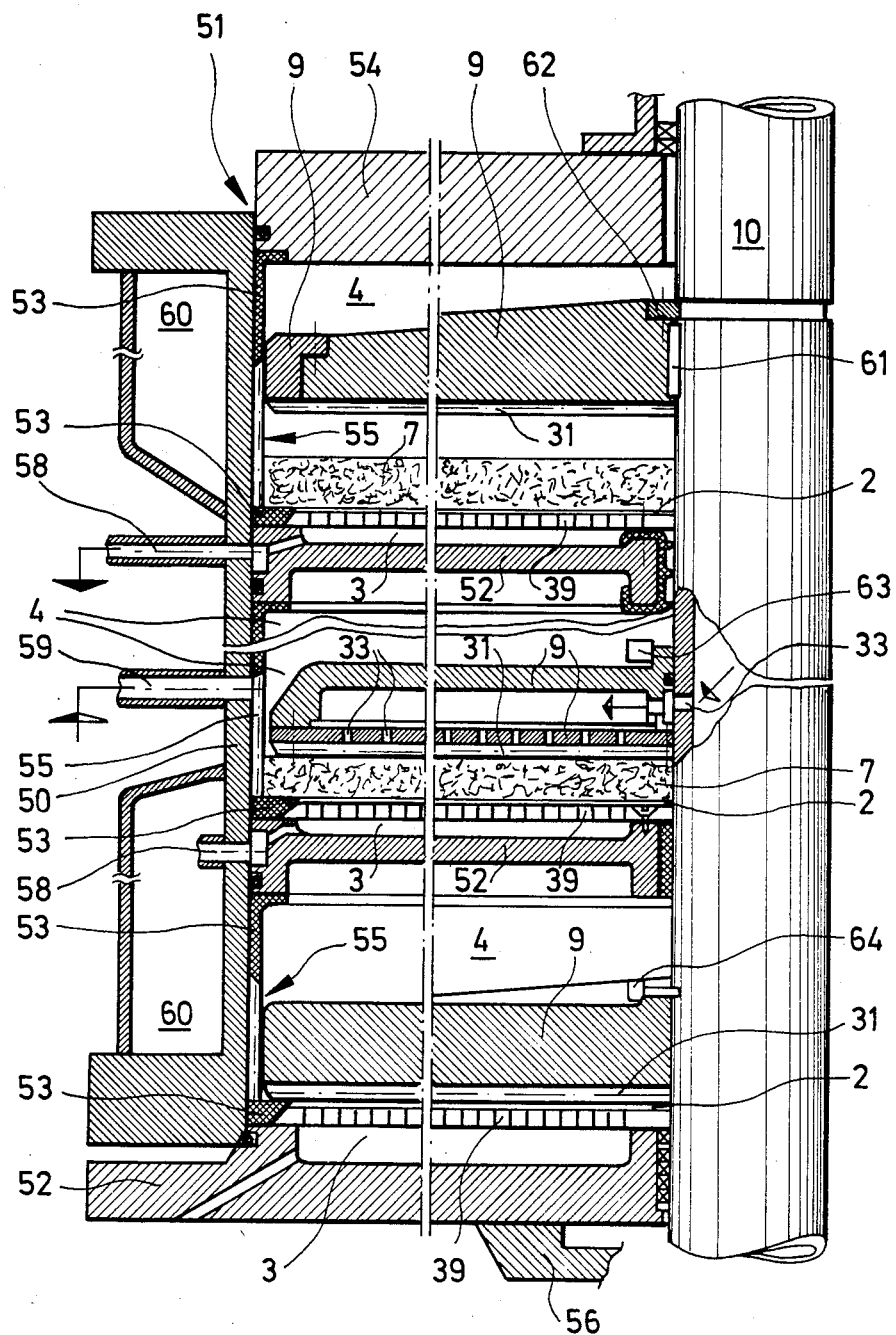
FIG. 7 shows one half of a longitudinal section of a third specific embodiment, three different rotor constructions being illustrated.
Figure 8:
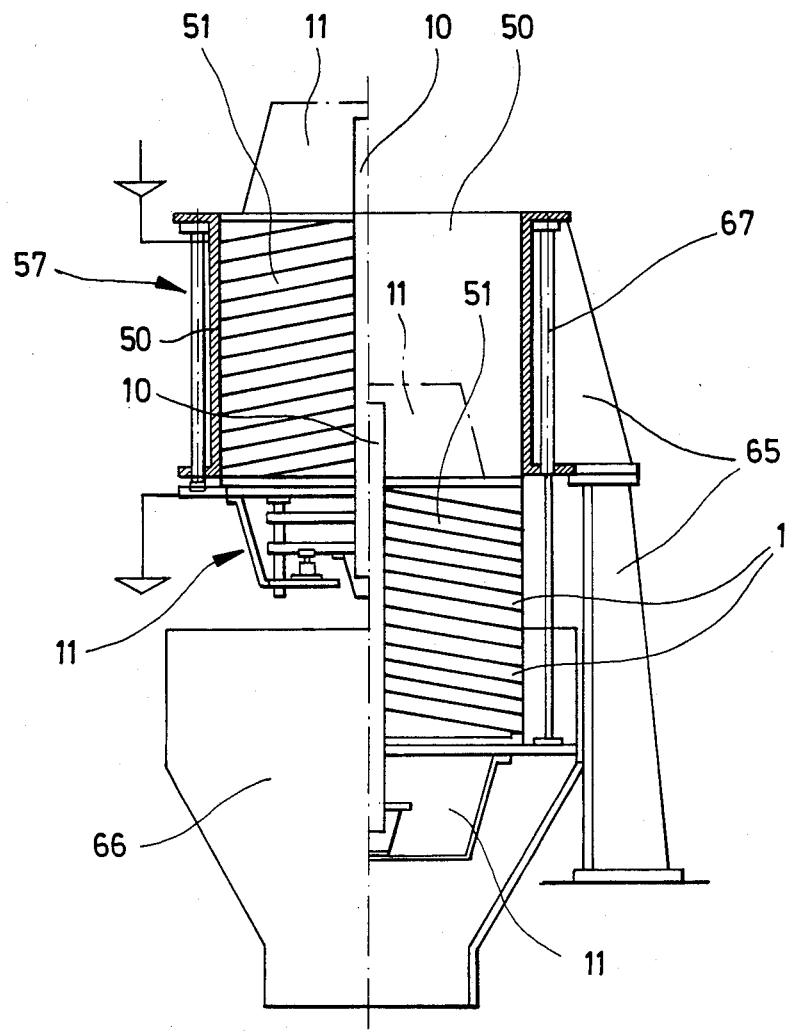
FIG. 8 shows a longitudinal section of a variant of the specific embodiment of FIG. 7.

The chamber housing 50 and the stack 51 may have a cylindrical or conical shape. FIGS. 7 and 8 shown chamber filter presses with a cylindrical chamber housing 50 and stack 51. The rotor shaft 10, which is coaxial with the central longitudinal axis of the chamber housing 50 and the stack 51, is arranged vertically. As shown in FIG. 7, tie rod 56 acts upon the lowest chamber plate 52 of the stack 51 and the upper end plate 54, in order to secure the stack 51 as such. The end plate 54, chamber plates 52 and spacers 53 lie at the outer circumference against the internal cylindrical surface of the chamber housing 50, suitable seals being arranged between the latter and the end plate 54, as well as the chamber plates 52, and between the later and the rotor shaft 10. Each hollow space 3 for receiving filtrate is connected over a filtrate outlet pipeline 58 with the filtrate outlet pipeline 6 or valve 22, as in FIG. 1. Each hollow space 4 for receiving pulp is connected over a pulp feed pipeline 59 with the pulp fee pipeline 5 or the valve 23, as in FIG. 1. The chamber housing 50 is provided with an external heating and/or cooling device 60, which is formed by two heating and cooling mantels, which can be acted upon by a gaseous or liquid heating or cooling medium, so that the chamber filter press can be used in exactly the same manner as conventional process filter equipment.

Three chambers are shown in FIG. 7, in which different positions and constructions of the associated rotors 9 are illustrated. In the upper chamber 1, rotor 9 in the associated hollow space 4 for receiving pulp assumes a central position between the filter cake 7 on the filter medium 2 and the end plate 54 and the rotor 9 is of solid construction and provided on the filter cake side with star-shaped radial ribs 31 and constructed conically on the other side. In the middle chamber 1, the associated rotor 9 is supported on the adjacent filter cake 7 and is of hollow construction and provided, on the filter cake side, with spray openings 32 in addition to radial ribs 31 and can be acted upon over connecting boreholes 33 of the hollow shaft 10 with a suitable liquid, preferably water, for washing the filter cake and/or the filter medium or with a gaseous pressure medium, preferably compressed air, for dewatering the filter cake further. In the lower chamber 1, the associated rotor 9 extends directly above the filter medium 2 of this chamber 1, as at the beginning of a filtering period or as is the case after removal or discharge of a filter cake 7, when a filter cake 7 is not yet formed or no longer present. The rotor 9 is of solid construction and is provided on the filter cake side with radial ribs 31. It differs from the rotor 9 of the upper chamber 1 essentially only the by the different shape of the longitudinal section as well as that it is formed in one piece, while the rotor 9 of the upper chamber 1 consists of two parts and has a detachably attached outer ring 9', which may consist of ring segments.

Furthermore, various possibilities of attaching the rotors 9 to the rotor shaft 10 are evident from FIG. 7. Accordingly, the rotors 9 can, in each case be connected nonrotatably with rotor shaft 10 with the aid of a wedge 61 and a split ring 62 or by means of a shrink ring 63 or with fastening screws 64.

In FIG. 7, the chamber housing 50 and the stack 51 are in that relative position, in which the chambers 1 and the filter cake discharge openings 55 of the spacer rings 53 are closed. The chamber housing 50 and the stack 51 lie against one another or are inserted into one another. In order to open chambers 1 or to release the filter cake discharge openings 55, the chamber housing 50 and the stack 51 are moved axially in opposite directions as shown in FIG. 7, into an open position, in which the chamber housing 50 and the stack 51 are removed from each other or pulled apart, as illustrated in FIG. 8. In this open position, the filter media 2 can also be exchanged, as will be further described below.

According to FIG. 8, the chamber housing 50 rests on a framework 65, on which a lower discharge hopper 66 for the discharged filter cake 7 is mounted. Between the chamber housing 50 or the framework 65 and the stack 51 are provided, several hydraulic working cylinders 67 which are distributed uniformly about the rotor shaft 10 and form the drive unit 57, by means of which the stack 51 is moved axially relative to the chamber housing 50 into the open position and into the closed position for the chambers 1 or the filter cake discharge openings 55 of the spacers 53. The open position is given in the right half of FIG. 8 and the closed position in the left half of FIG. 8. It is also evident from this that the chamber plates 52, the spacers 53, the filter medium 2 and the rotors 9 can have a conical shape, as discussed by means of the left half of FIG. 3, and that the rotational as well as the axial displacement drive unit 11 of rotor shaft 10 can be arranged below or above stack 51, as is indicated by unbroken or dot-dash lines. Kinematic reversal is also possible in the manner that the stack 51 is stationary and connected with the framework 65, while the chamber housing 50 is movable and moved in an axial direction by means of the drive unit 57, which offers the advantage that the load to be moved is less.

The chamber filter presses of FIGS. 9 to 16 essentially differ from those of FIGS. 7 and 8 in that the chamber housing 50 and the stack 51 have a conical shape, so that, for simultaneously opening all chambers 1 or the filter cake discharge openings 55 of all spacers 53, it is not necessary that the chamber housing 50 and the stack 51 be pulled apart completely, but rather, they can be moved in opposite axial directions a relatively small distance. According to FIG. 9 the hydraulic working cylinders 67 of drive unit 57 are disposed between the upper end plate 54 of stack 51 and a lower outer flange 68 of the chamber housing 50. On the end plate 54, several guide columns 69 are attached, which are distributed uniformly about rotor shaft 10, and carry a crossbar 70 and guide a housing 71 for gearwheel 11a of the rotational and axial displacement drive unit 11. The latter furthermore has several hydraulic working cylinders 11c instead of the threaded wheel 11b, which are rotatably, yet axially rigidly, connected with rotor shaft 10 and which are distrubted uniformly about rotor shaft 10. The crossbar 70 is rigidly connected with the guide columns 69 and is provided with a drive unit 72 for the tie rod 56, by means of which the tie rod 56 can be moved axially between two positions in which the stack 51 is fastened or released, as will be described further below.

Figure 10:
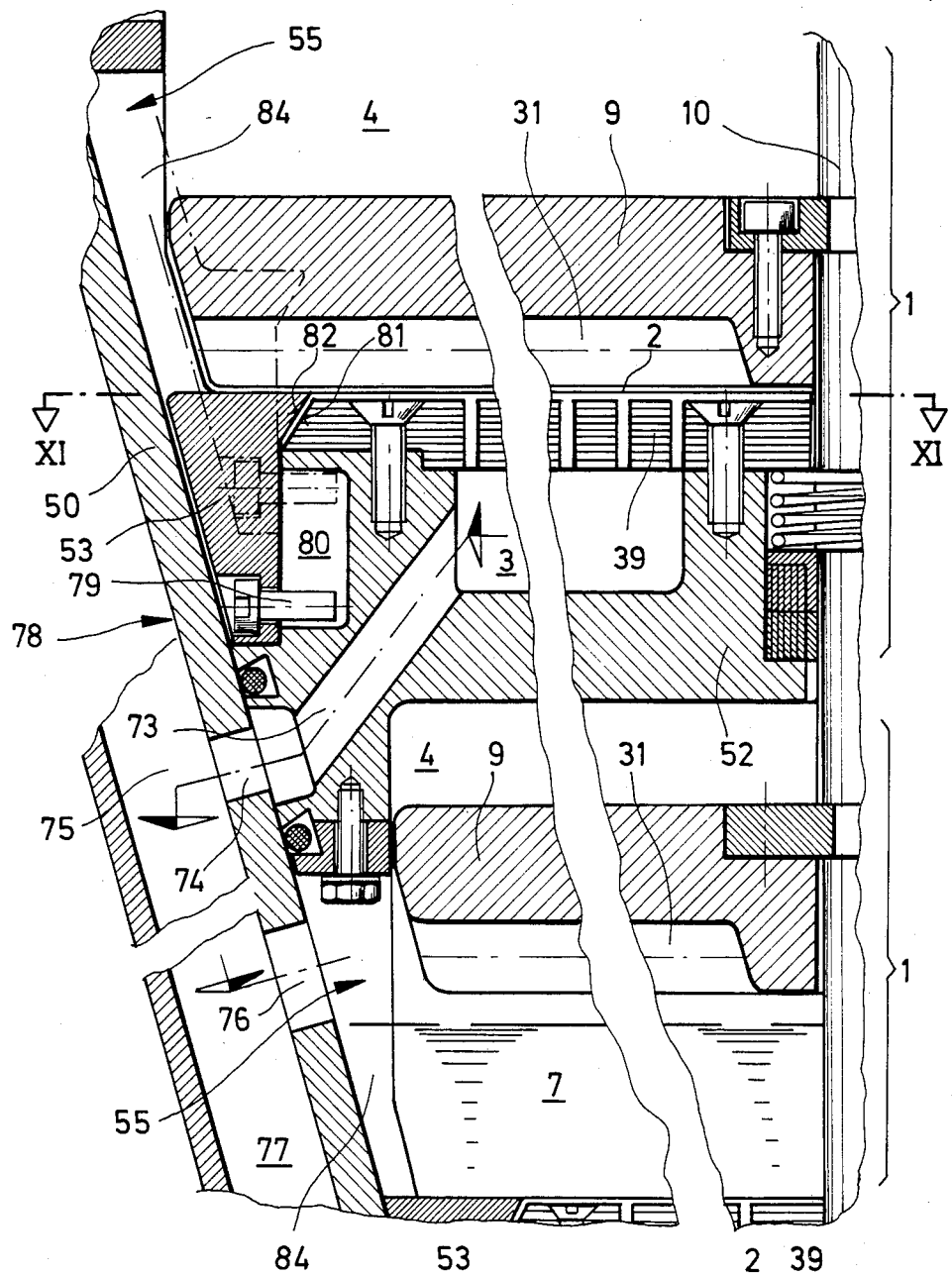
FIG. 10 shows a part of a longitudinal section of FIG. 9 on a larger scale.
Figure 11:
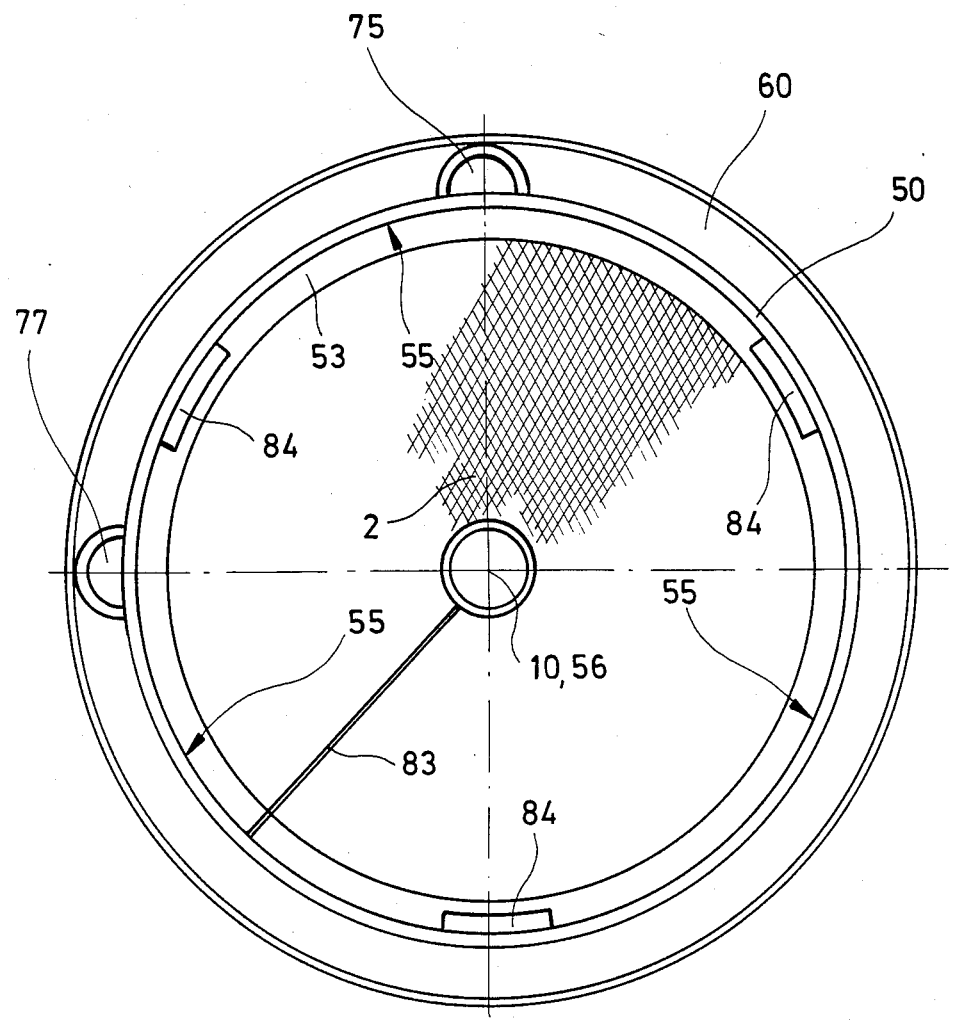
FIG. 11 shows the complete cross-section along the line XI—XI in FIG. 10 on a smaller scale.

According to FIGS. 10 and 11, the hollow spaces 3 of chamber plates 52 for receiving filtrate are in each case connected over a plate channel 73 and a through-hole 74 of the chamber housing 50 with a common filtrate outlet channel 75, which runs outside along chamber housing 50 and is connected to the filtrate outlet pipeline 6 or valve 22, as shown in FIG. 1. The hollow spaces 4 between chamber plates 52 for receiving pulp are also, in each case, connected over filter cake discharge openings 55 as well as over a through-hole 76 of the chamber housing 50 with a common pulp feed channel 77, which runs outside along chamber housing 50 and is connected to the pulp feed pipeline 5 or to valve 23, as shown in FIG. 1.

Figure 9:
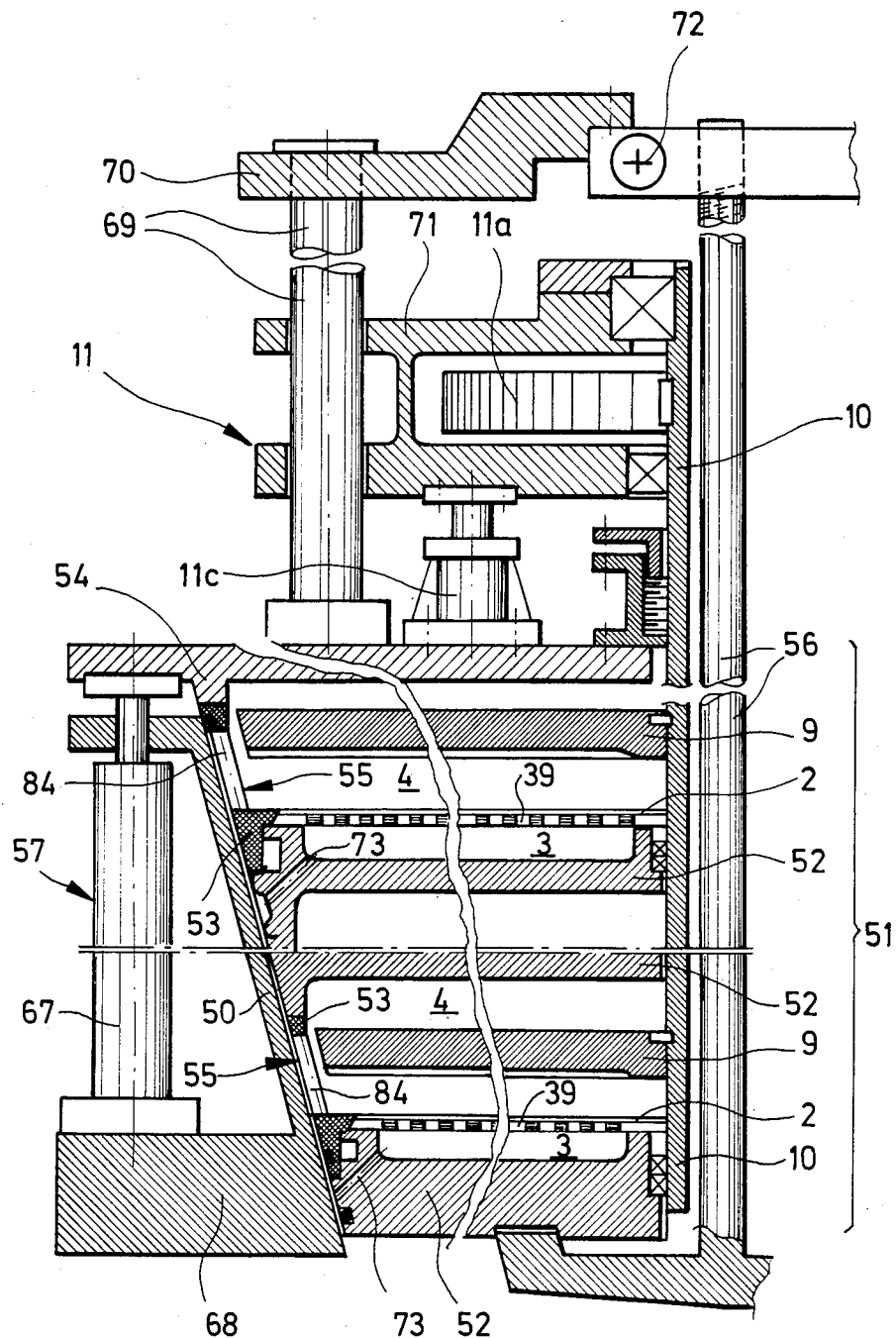
FIG. 9 shows one half of a longitudinal section of a fourth specific embodiment.

In order to open chambers 1 or the filter cake discharge openings 55 of the spacers 53, stack 51 is raised from the closed position of FIGS. 9 and 10 by means of the drive unit 57, whereupon the rotors 9 can be activated so as to remove the filter cakes 7 from the filter media 2 and to discharge them from the hollow spaces 4 for receiving pulp into the annular space, which is formed between the chamber housing 50 and the stack 51, in which they can slide downwards. Stack 51 can thereupon be lowered once again into the closed position for chambers 1 or for the filter cake discharge openings 55 of the spacers 53 and brought to lie against chamber housing 50, as shown in FIGS. 9 and 10, in which different rotor positions and states for chambers 1 are illustrated.

In FIG. 10, the filtrate outlet channel 75 is displaced by 90° in the circumferential direction of the chamber housing 50 relative to the representation in FIG. 11. More filtrate outlet channels 75 and pulp feed channels 77 may also be provided outside on the chamber housing, as shown in FIG. 11.

For the easy exchange of filter media 2, supports 78 are provided between the chamber plates 52 and the spacers 53. According to FIG. 10, the supports 78 are formed by screws 79, which are screwed laterally at the lower end into each spacer 53. Each spacer is attached at the chamber plate 52 adjacent at the top, with the exception of the top spacer 53, which is screwed to the end plate 54. The screws 54 furthermore project laterally into a circumferential recess 80 of the chamber plate 52 adjacent at the bottom. The filter media 2 are in each case wedged at the external periphery between a conical surface 81 of the associated lower chamber plate 52 or the backing plate 39 for the respective filter medium 2 attached thereto and a corresponding conical surface 82 of the adjacent spacer 53 and, according to FIG. 11, provided with a radial slot 83. It is evident from FIG. 11 that the spacers 53 in each case have three crosspieces 84 in the middle region, which extend along the chamber housing 50 between the respective filter cake discharge openings 55 and that the chamber housing 50 can be provided with the heating and/or cooling facilitates 60 that have been described.

In order to exchange the filter media 2, it suffices to lift stack 51 completely out of the chamber housing 50 by means of drive unit 57 and to loosen the bracing of stack 51, that is, to switch on the drive unit 72 of tie rod 56, so that the latter runs downwards, as a result of which the stack 51 opens up and the chamber plate 52 as well as the spacers 53 move apart by a certain distance until the supports 78 become effective, that is, until the screws 79 of each spacer 53 abut on the upper side face of the circumferential recess 80 of the chamber plate 52 adjacent at the bottom, as indicated in FIG. 10 by the dot-dash lines. The conical surfaces 82 of the spacers 53 have been lifted off from the conical surface 81, with which they work together, and the filter media 2, which were wedged in at the respective external circumference, are released, so that they can be removed and replaced by new filter media 2, which is possible without difficulty owing to the respective radial slot 83. The new filter media 2 are easily fixed in place owing to the fact that the tie rod 56 is activated in the reverse direction by mans of drive unit 72 and the stack 51 is secured once again. Subsequently, it can be lowered into the chamber housing 50 once again with the assistance of drive unit 57.

Figure 12:
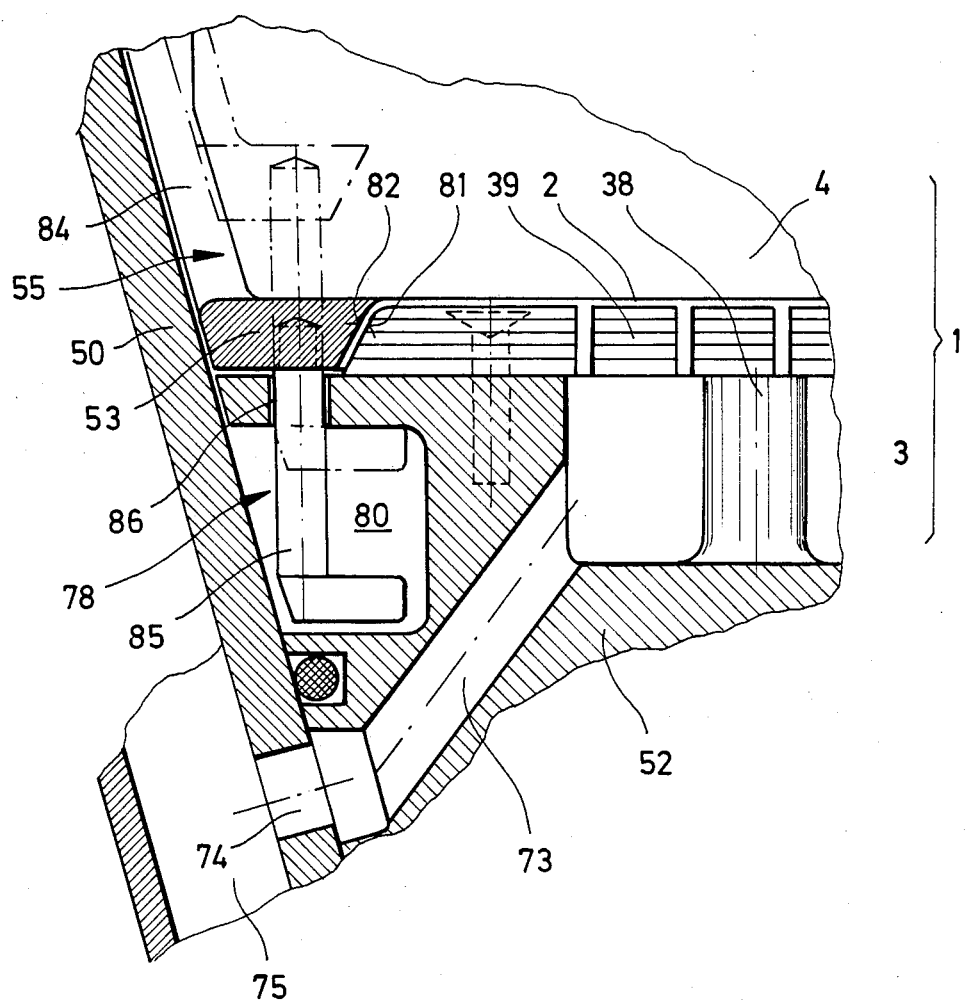
FIG. 12 shows a variant in a view corresponding to that of FIG. 10.

In accordance with FIG. 12, it is also possible to provide each spacer 53 with T-head bolts 85 instead of with lateral screws 79. These T-head bolts 85 form the supports 78, are screwed into the respective spacer 53 from below and protrude from above into the circumferential recess 80 of the chamber plate 52 below, through a borehole 86 of the same so that their T-heads work together with the upper lateral face of the circumferential recess 80, during the described stack loosening process, as indicated by the dot-dash lines in FIG. 12.

In much the same way as the connecting rods 16 and 17 of the chamber filter press of FIG. 1 are hollow and provided with connecting boreholes, the tie rod 56 may also be hollow and provided with connecting boreholes, in which case, however, these lead into the hollow rotor shaft 10, which in turn is provided with the described connecting boreholes 33 to the hollow rotors 9 or, like connecting rods 16 and 17, with connecting boreholes to the hollow spaces 3 of the chamber plates 52 for receiving filtrates or with connecting boreholes to the hollow spaces 4 between the chamber plates 52 for receiving pulp, so that it is possible to act upon the hollow tie rod 56 with the wash liquid or the pressure medium for the hollow rotors 9, as described in conjunction with FIG. 7, or with the filtrate outlet pipeline 6 or the valve 22, as shown in FIG. 1, for the purpose explained in conjunction therewith.

Figure 13:
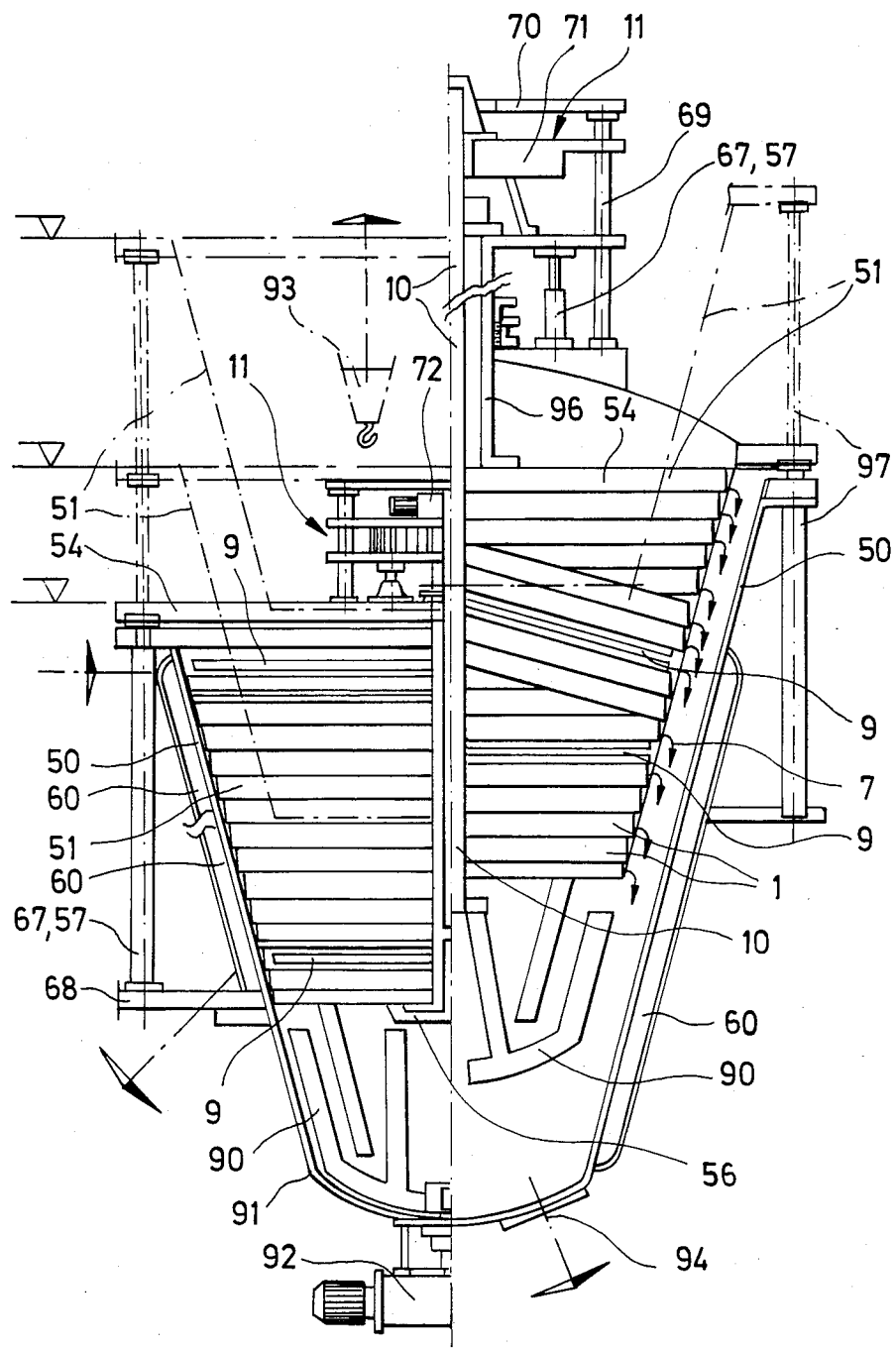
FIG. 13 shows a longitudinal section of further variants of the specific embodiments of FIGS. 9 to 11, one variant being shown in the left half and a different one in the right half.

In the left half, FIG. 13 shows a chamber filter press, similar to those of FIGS. 9 to 12, which, in addition to the heating and/or cooling device 60 that surrounds stack 51, has an agitator 90 on the outside of the chamber housing 50 on one side, that is, below stack 51. This agitator 90 is enclosed in a conical pot 91 mounted on housing 50 and is provided with a drive unit 92. Its function is to stir and knead the discharged filter cakes 7 in pot 91, in which the solid materials of the filter cakes 7 can be dried completely, for which purpose the pot 91 can be provided with an external heating device. It is also possible to cool the solid materials in pot 91 by means of a suitable cooling device and/or to treat them otherwise, so that the chamber filter press, as shown in the left half of FIG. 13, can be used like conventional process filter equipment, but, compared to such equipment, has a significantly larger capacity if for no other reason than the significantly larger filtering area that results from the lage number of filter media 2. As mentioned hereinbefore, conventional process filtering equipment has only a single filter medium covering the cross-section of the inner space for removing the solids from the respective pulp in terms of a strictly surface filtration.

In the left half of FIG. 13, unbroken lines show the chamber housing 50 and the stack 51 in the closed position of chambers 1 and filter cake discharge openings 55 of spacers 53. Those two positions of stack 51, in which it is raised in chamber housing 50 by means of drive unit 57 for the purpose of removing or discharging filter cake or lifted out of chamber housing 50 by means of drive 57 for the purpose of exchanging the filter media, are indicated by dot-dash lines. Instead of this, a crane with a crane hook 93 can also be used, as shown with dot-dash lines in the left half of FIG. 13. The previously described kinematic reversal, in which the stack 51 is stationary and the chamber housing 50 is movable, is also possible.

In the right half, FIG. 13 shows a chamber filter press in the open position for chambers 1 and filter cake discharge openings 55 of the spacers 53. This differs from that of the left half of FIG. 13 essentially only owing to the fact that the conical chamber housing 50 has a completely closed off structure and encloses the conical stack 51 even when chambers 1 and the filter cake discharge openings 55 of the spacers 53 are in the open position. Moreover, agitator 90 is mounted on rotor shaft 10, so that drive unit 92 is not required. Instead of having a pot 91, the chamber housing 50 is arranged in the shape of a pot in the lower region of stack 51 and provided with a removal opening 94, the heating and/or cooling device 60 also surrounding the pot-shaped region of the chamber housing 50.

This chamber filter press can be used to particular advantage as process filter equipment, because no substance can escape from the completely closed off chamber housing 50 into the surrounding atmosphere, not even when the filter cakes 7 are being removed or discharged from chambers 1. This is shown in the right half of FIG. 13. Even the discharged filter cakes 7 can be treated further in chamber housing 50 in such a manner that the substances cannot reach the surrounding atmosphere. They leave the chamber 50 only when contamination of the environment no longer need be feared. This is particularly important when poisonous or otherwise harmful pulps are filtered.

According to the right half of FIG. 13, chamber housing 50 has an arched lid 95, which carries not only the guide columns 69 with the crossbar 70, on which the rotational as well as axial displacement drive unit 11 of rotor shaft 10 or the housing of the same is guided, but also the hydraulic working cylinders 67 of drive unit 57, which act upon a bushing 96 that surrounds rotor shaft 10, penetrates through lid 95 and also, guided on guide columns 69, is attached to the end plate 54 of stack 51 and sealed relative to the rotor shaft 10 and the lid 95. By means of the hydraulic working cylinder 67, bushing 96 in lid 95 can be moved back and forth in the axial direction in order to lift stack 51 into the open position shown for the chambers 1 and the filter cake discharge openings 55 of spacers 53 or to lower it into closed position, in which stack 51 lies against chamber housing 50. The rotational and axial displacement drive unit 11 is connected with bushing 96. If the housing 71 is guided on guide columns 69, then the hydraulic working cylinders 11c are arranged between the housing 71 and the bushing 96, as shown in FIG. 9.

Separate hydraulic working cylinders 97 are provided in order to be able to raise stack 51 into the position indicated by the dot-dash lines in the right half of FIG. 13 for the purpose of exchanging filter media. For this movement of the stack 51, the lid 95 of chamber housing 50 is carried along, for which purpose the interlocking device must preveiously be released. Once again, kinematic reversal is possible in the sense that the lid 95 is arranged to be stationary and the chamber housing 50 is arranged to be movable, in order to be moved in the axial direction by the hydraulic working cylinder 97.

Moreover, it is also indicated in the right half of FIG. 13 that the chamber plates 52, spacers 53, filter media 2 and rotors 9 can have a conical instead of a flat construction, as is explained in connection with the left half of FIG. 3.

Figure 14:
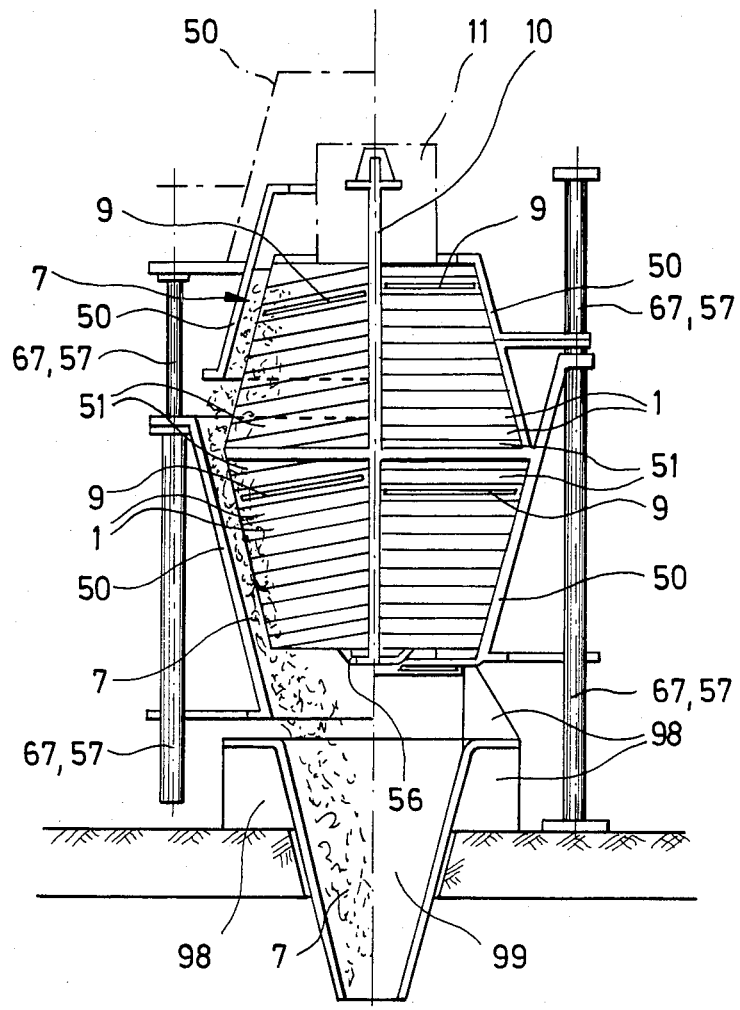
FIG. 14, shows a longitudinal section of additional variants of the specific embodiments of FIGS. 9 to 11, one variant being reproduced in the left half and a different variant in the right half.

FIG. 14 illustrates a chamber filter press with a two-part, biconical chamber housing 50 and a biconical stack 51, which is arranged to be stationary and supported on a framework 98 with a discharge hopper 99 for the filter cakes 7 that are emptied or discharged from the chambers 1. In order to open and close the chambers 1 of chamber housing 50 or the filter cake discharge openings 55 of spacers 53, the two halves of the chamber housing 50 are axially movable relative to stack 51 by means of the hydraulic working cylinders 67 of drive unit 57, which are distributed uniformly about the rotor shaft 10. In this connection, the lower half of chamber housing 50 can be constructed, as shown in the right half of FIG. 14, so that it overlaps the upper half. The hydraulic working cylinders 67 can, as shown in the left half of FIG. 14, be attached to the framework 98, one group acting upon the lower half and a different group on the upper half of the chamber housing 50, or however, as shown in the right half of FIG. 14, be supported with a group on the floor and act on the lower half of chamber housing 50, while the other group is attached to the upper half of the chamber housing 50 and likewise acts on the lower half of chamber housing 50.

While a chamber filter press with flat chamber plates 52, spacers 53, filter media 2 and rotors 8 is illustrated in the right half of FIG. 14, a chamber filter press with conical chamber plates 52, spacers 53, filter media 2 and rotors 9 is reproduced in the left half of FIG. 14, as explained in connection with the left half of FIG. 3. In the right half of FIG. 14, the chamber housing 50 and the stack 51 are in the closed position for chambers 1 and the filter cake discharge openings 55 of spacers 53, while in the left half of FIG. 14 they assume the open position, and the filter cakes, which fall into the discharge hopper 99, are discharged. The particular position, in which the upper half of chamber housing 50 is raised by means of the hydraulic working cylinder 67 of drive unit 57 for the purpose of exchanging filter media, is indicated there with dot-dash lines.

Figure 15:
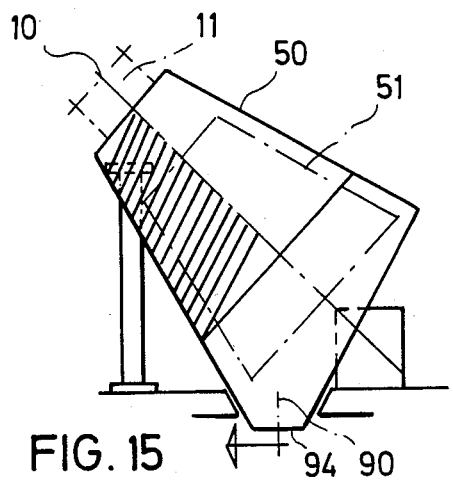
FIG. 15 shows a side view of a modification of the variant of the right half of FIG. 13.

FIG. 15 shows a chamber filter press 15, which essentially differs from that of the right half of FIG. 13 in that the rotor shaft 10 is arranged at an angle and that chamber 50 is stationary. Furthermore, the rotational and axial drive unit 11 of the rotor shaft 10 is provided on the end of the smaller diameter of the chamber housing 50, the agitator 90 being arranged in the lower region of chamber housing 50 with its axis of rotation perpendicular to the floor, on which the chamber housing 50 is supported. The chamber housing 50 is designed accordingly, being pot-shaped and conical with a lower withdrawal opening 94. The stack 51 can be moved axially from the closed position, indicated by the unbroken lines, into the open position (indicated by dot-dash lines) of chambers 1 and filter cake discharge openings 55 of spacer rings 53 and also in the reverse direction in the manner described.

Figure 16:
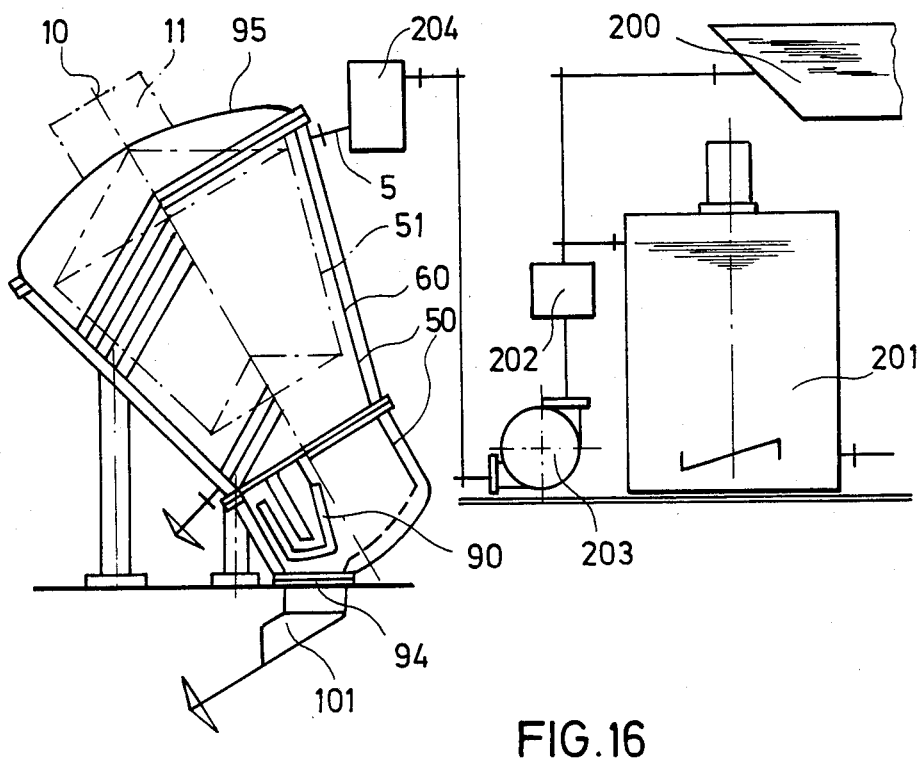
FIG. 16 shows a side view of a further modification of the variant of the right half of FIG. 13.

FIG. 16 shows the chamber filter press corresponding to the right half of FIG. 13, but in an inclined arrangement similar to that of FIG. 15. A discharge chute 101 for the discharged filter cakes 7 or their solid materials is connected to the discharge opening 94 of chamber housing 50. At the end holding the agitator 90, chamber housing 50 is designed as an evaporator or drier for the discharged filter cakes 7 of their solid materials and is provided with an external heating device 60. The open position of the stack 51 in chamber housing 50, in which the chambers 1 and the filter cake discharge openings 55 of the spacers 53 are opened and filter cakes 7 can be removed or discharged, is indicated with dot-dash lines.

The chamber filter press of FIG. 16 is connected to a mud tank 200 of a sewerage purification plant or to a suspension tank 201 for the treatment of pulp or the benefication of the solids of pulp, and moreover over a collector 202 for metal particles or other solids, a pulp pump 203 and a conditioning vessel 304, in which suitable filtration aids are metered into the pulp, which then enters the pulp feed pipeline 5.

If desired, the chamber filter presses according to FIGS. 7 to 16 can also be arranged with a horizontal rotor shaft 10, just as it is possible, in case of need, to arrange the chamber filter presses of FIGS. 1 to 6 at an angle, that is, with rotor shaft 10 inclined relative to the floor. For the chamber filter presses of FIGS. 7 to 16, it is also particularly simple to act upon the hollow spaces 3 of chamber plates 52 for receiving filtrate and/or the hollow spaces 4 of chamber plates 52 for receiving pulp with a gaseous sterilizing agent, preferably steam.

The inventive chamber filter presses can be used at least wherever conventional chamber filter presses or process filter equipment find application. For the last-mentioned application, it is moreover advantageous that the expensive tilting mechanisms, usually required for conventional process filter equipment for emptying out the filter cake, be omitted.

I claim:

1. A chamber filter press comprising in combination a plurality of first chamber plates fixedly secured in spaced relationship parallel to each other to at least one first hollow connecting rod, each of said first chamber plates comprising two spaced apart circular perforate backing plates extending parallel to each other and each being provided with a filter medium, the backing plates defining a first hollow space in each of said first chamber plates fluidly connected by a bore hole to said at least one first hollow connecting rod for discharging filtrate received through said filter medium and said perforate backing plates, a plurality of second chamber plates fixedly secured in spaced relationship parallel to each other to at least one second hollow connecting rod, each of said second chamber plates being provided with a circular opening and being substantially disposed parallel to and between two adjacent of said first chamber plates so as to receive circumferential end portions of the backing plates thereof so that second hollow spaces are defined within each of said second chamber plates by said adjacent backing plates, said second hollow spaces being in fluid connection with said at least one second connecting rod by respective bore holes for the supply of pulp to be filtered into the second hollow spaces, each of said first chamber plates being provided with a central through hole penetrated by a rotor shaft extending through said filter press parallel to said first and second connecting rods, said rotor shaft being provided with a plurality of rotor plates fixedly secured thereto in spaced relationship to each other, each of said rotor plates being disposed in a different one of said second hollow spaces and being provided with generally radially extending ribs, means for supporting said first and second connecting rods such that they are axially displaceable with respect to each other, driving means operationally connected to said first and second connecting rods so as to mutually axially displace said first and second connecting rods in order to effect a mutual movement of the first and second chamber plates between a closed position in which the second chamber plates engage both of the adjacent first chamber plates, and a first open position in which the first chamber plates in each case are pulled out on one side from one of the adjacent second chamber plates, and a second open position wherein the first chamber plates are pulled out on the other side from the other of said adjacent second chamber plates, wherein the outermost of said series of second chamber plates each are formed by end plates each having a circular recess housing a rotor plate and receiving the circumferential end portion of the backing plate of the respective adjacent first chamber plate and being provided with a central through hole penetrated by said rotor shaft, and driving means connected to said rotor shaft for rotatably driving and axially displacing said rotor shaft with respect to said first chamber plates.

2. A chamber filter press as set forth in claim 1 wherein said first chamber plates are provided with through bores in their edge portions and said second chamber plates are supported by a plurality of second connecting rods being slidably supported in said through bores.

3. A chamber filter press as set forth in claim 1 or 2 wherein said at least one first connecting rod is fixedly secured to an external crossbar supporting said rotor shaft driving means, said external crossbar being operationally connected to said connecting rod mutual displacement driving means.

4. A chamber filter press as set forth in claim 1 or 2 wherein said rotor shaft and said rotor plates each are hollow, the hollow spaces defined thereby being fluidly connected with each other, the rotor plates being provided with spray nozzles directed to the backing plates.

5. A chamber filter press as set forth in claim 1 or 2 wherein said rotor shaft and said rotor plates each are hollow, the hollow spaces defined thereby being fluidly connected with each other, the rotor plates being provided with flexible membranes defining the hollow spaces and being adapted to be pressed towards the filter medium supported by the opposing filter medium supported by the respective backing plates upon inflation of said hollow spaces by means of a pressurized fluid.

6. A chamber filter press comprising a housing having side walls and being closed at both ends by end plates, a stack of a plurality of filter plates having parallel extending sides being disposed within said housing in parallel relationship with respect to each other and each defining a first hollow space within said filter plates being covered at one of said parallel extending sides by a perforate backing plate provided with a filter medium, one of said end plates being formed as a filter plate as well, said filter plates being held in spaced relationship with respect to each other and to the end plates by spacers so as to define a plurality of second hollow spaces between said filter plates, said filter and end plates each being provided with a central through bore penetrated by a rotor shaft, said rotor shaft being provided with a plurality of rotor plates secured thereto so as to rotate therewith and each being disposed in a different one of said second hollow spaces, said housing comprising at least one input opening for the supply of liquid to be filtered into said second hollow spaces, and a plurality of outlets for draining filtrate from said first hollow spaces, driving means for rotatably driving and axially displacing said rotor shaft with respect to said housing, and means for removing said side walls in the axial direction of said rotor shaft from said stack of filter plates and said rotor shaft so as to open said second hollow spaces for the discharge of filter cakes formed on said backing plates during operation of the filter press.

7. A filter press as set forth in claim 6 wherein the filtrate drain outlets are provided in said side walls.

8. A filter press as set forth in claim 6 or 7 wherein said rotor shaft and said rotor plates each are hollow, the hollow spaces defined thereby being fluidly connected with each other by connecting bore holes in said rotor shaft, said rotor plates being provided with spray nozzles directed towards said backing plates.

9. A filter press as set forth in claim 6 or 7 wherein said rotor shaft is hollow and a tie rod penetrating said hollow rotor shaft releasably engages the end plates of said housing.

10. A filter press as set forth in claim 9 wherein said tie rod is coupled to a driving means for tightening and releasing the engagement of said tie rod with said housing end plates.

11. A filter press as set forth in claim 6 or 7 wherein said spacers each are ring members being provided with filter cake discharge openings in their circumference.

* * * * *

UNITED STATES PATENT AND TRADEMARK OFFICE
CERTIFICATE OF CORRECTION

PATENT NO. : 4,722,789

DATED : February 2, 1988

INVENTOR(S) : Dieter Kupka

It is certified that error appears in the above-identified patent and that said Letters Patent is hereby corrected as shown below:

Column 8, line 55, "for receiving pupl" should read:

--for receiving pulp--

Column 9, line 38, last word "shown" should read --show--.

Signed and Sealed this

Twelfth Day of July, 1988

*Attest:*

DONALD J. QUIGG

*Attesting Officer*      *Commissioner of Patents and Trademarks*